(12) United States Patent
Hunsinger

(10) Patent No.: US 6,571,506 B1
(45) Date of Patent: Jun. 3, 2003

(54) CHEMILUMINESCENT FISHING FLOAT AND METHOD OF USING

(76) Inventor: Larry P. Hunsinger, 3398 Yukon Dr., Port Charlotte, FL (US) 33948

( * ) Notice: Subject to any disclaimer, the term of this patent is extended or adjusted under 35 U.S.C. 154(b) by 0 days.

(21) Appl. No.: 10/127,301

(22) Filed: Apr. 22, 2002

(51) Int. Cl.[7] .............................................. A01K 75/02
(52) U.S. Cl. ...................................................... 43/17.5
(58) Field of Search ................................. 43/17.5, 17.6

(56) References Cited

U.S. PATENT DOCUMENTS

| | | | | |
|---|---|---|---|---|
| 2,236,215 A | * | 3/1941 | Klinitski ..................... | 43/17.5 |
| 2,829,464 A | * | 4/1958 | Pettitt, Jr. et al. ......... | 43/44.91 |
| 3,056,229 A | * | 10/1962 | Haney ....................... | 43/44.87 |
| 3,576,987 A | * | 5/1971 | Voight et al. ................ | 362/34 |
| 3,861,072 A | * | 1/1975 | Holcombe .................. | 43/17.6 |
| 3,863,380 A | * | 2/1975 | Purlia ........................ | 43/17.6 |
| 4,458,439 A | * | 7/1984 | Garrett, Sr. ................. | 43/17.6 |
| 4,508,642 A | * | 4/1985 | World ........................ | 252/700 |
| 4,638,584 A | * | 1/1987 | Lindsay ..................... | 43/17.6 |
| 4,777,756 A | * | 10/1988 | Mattison .................... | 43/17.6 |
| 4,800,670 A | * | 1/1989 | Mattison .................... | 43/17.6 |
| 5,067,051 A | * | 11/1991 | Ladyjensky ................. | 362/34 |
| 5,159,774 A | * | 11/1992 | Bennis et al. ............... | 43/17.5 |
| 5,190,366 A | * | 3/1993 | World ........................ | 362/34 |
| 5,199,205 A | * | 4/1993 | Klammer .................... | 43/17 |
| 5,213,405 A | * | 5/1993 | Giglia ........................ | 362/34 |
| 5,651,209 A | * | 7/1997 | Rainey ....................... | 43/17.5 |
| 5,673,988 A | * | 10/1997 | Fujita ......................... | 362/34 |
| 5,675,927 A | * | 10/1997 | Kloos ......................... | 43/17.5 |
| 6,009,659 A | * | 1/2000 | Shannon et al. ............ | 43/44.91 |
| 6,021,595 A | * | 2/2000 | Noel ........................... | 43/17.6 |

* cited by examiner

Primary Examiner—Charles T. Jordan
Assistant Examiner—Jordan M Lofdahl

(57) ABSTRACT

A new and improved chemiluminescent fishing float device and method of using the device are described. The chemiluminescent fishing float is able to provide an above water chemiluminescent light source for use in visually locating where the float is floating as well as providing an underwater chemiluminescent light source for use in attracting fish towards the underwater vicinity where the float is floating. The chemiluminescent fishing float device comprises a chemiluminescent light stick that is slidably lockable into a central passageway of a bobber. The bobber also has a means for attaching onto a fishing line. Both ends of the locked in place chemiluminescent light stick protrude from the central cavity of the bobber, whereby providing the above water and the below water light source. The method comprises obtaining the new and improved chemiluminescent fishing float, activating the chemiluminescent light stick, wrapping a fishing line around the chemiluminescent light stick, forcing the chemiluminescent light stick wrapped with fishing line into the central passageway of the bobber, putting a hook on the end of the fish line, baiting the hook, casting the combined bobber/chemiluminescent light stick/hook conglomerate into water and attracting fish with the light.

1 Claim, 2 Drawing Sheets

CHEMILUMINESCENT FISHING FLOAT AND METHOD OF USING

FIELD OF THE INVENTION

The present invention relates in genral to fishing floats or bobbers, and more particularly, to a bobber which may be illuminated for providing a greater visibility as well as attracting fish towards it.

DESCRIPTION OF THE PRIOR ART

While fishing, it is important that a fisherman be able to spot when the fish first takes the bait so that the hook may be properly set before the bait is released by the fish. Conventional fishing bobbers provide visual indication of when the fish grabs the bait so that the fisherman may react to set the hook. While these bobbers may prove adequate for this purpose during the portions of the day when lighting conditions allow the fisherman to easily view the bobber, they are less than desirable under poor lighting conditions, such as at night and early in the morning when the bobber is less visible. Under these conditions, a fisherman may be unable to properly set the hook and may subsequently lose the fish that he might otherwise have been able to catch if he were able to visually see the bobber bobbing in the water. Therefore, a need exists for a bobber that can be seen during low light environments. Since it is no secret that fish are attracted to lights, then a light-emitting float would satisfy the need to see the float as well as attract fish. Unfortunately do to the reflective nature of the surface of water, a significant proportion of light directed towards the water surface will be reflected away from the water. Therefore a need exist for a bobber which is able to be seen during low light environments by the fisherman, as well as, being able to be seen by the fish themselves so as to attract the fish towards the bobber.

A wide variety of fishing bobbers and floaters is currently available on the commercial market and an even larger number of these types of devices are known in the art of fishing bobbers and floaters as exemplified, for example, the fishing float assembly disclosed by Kurka and Brandesjs in U.S. Pat. No. 4,649,660; the illuminable fishing float disclosed by Reed in U.S. Pat. No. 4,827,655; the fishing float disclosed yb Severance and Kirby in U.S. Pat. No. 4,856,219; the fishing bobber disclosed by Burns in U.S. Pat. No. 5,235,777; the illuminated line fishing apparatus disclosed by Ross in U.S. Pat. No. 5,274,945; and the fishing bobber disclosed by Reed in U.S. Pat. No. D307,932.

Outside of the art of fish bobbers and floaters, the luminescent floating sinker described by Wohead in U.S. Pat. No. 4,693,030 discloses a phosphorescent light source contained entirely within the sinker. Since a sinker by definition sinks, then the Wohead device should be considered outside the art of bobbers and floaters. Furthermore, the Wohead device is wholly silent with regards to above water light sources and is explicitly provides an underwater light source. Furthermore, the Wohead device is silent with regards to chemiluminescent light source because Wohead explicitly describes a luminescent material that can be 'activated by a flashlight or the like.' Therefore, not only is the Wohead device outside of the art of bobbers and floaters, it is also silent with regards to chemiluminescence as well as above water light sources.

While all of the above-described devices fulfill their respective, particular objectives and requirements, the aforementioned patents do not describe a chemiluminescent fishing float having both ends of the locked in place chemiluminescent stick protruding from the central passageway of the bobber. This would specifically match the user's particular individual needs of a floater that makes it possible to simultaneously provide an above water chemiluminescent light source as well as an underwater chemiluminescent light source.

Therefore, a need exists for a new and improved chemiluminescent fishing float that can be used for simultaneously providing an above water chemiluminescent light source as well as an underwater chemiluminescent light source. In this respect, the chemiluminescent fishing float according to the present invention substantially departs from the conventional concepts and designs of the prior art, and in doing so provides an apparatus primarily developed for providing a chemiluminescent fishing float having both ends of the locked in place chemiluminescent stick protruding from the central passageway of the bobber providing an above water chemiluminescent light source as well as an underwater chemiluminescent light source.

SUMMARY OF THE INVENTION

The present device, according to the principles of the present invention, overcomes the shortcomings of the prior art by providing a new and improved chemiluminescent fishing float device is described. The chemiluminescent fishing float is able to provide an above water chemiluminescent light source for use in visually locating where the float is floating as well as providing an underwater chemiluminescent light source for use in attracting fish towards the underwater vicinity where the float is floating. The chemiluminescent fishing float device comprises a chemiluminescent light stick that is slidably lockable into a central passageway of a bobber. The bobber also has a means for attaching onto a fishing line. Both ends of the locked in place chemiluminescent light stick protrude from the central cavity of the bobber, whereby providing the above water and the below water light source.

In view of the foregoing disadvantages inherent in the known type fishing floats now present in the prior art, the present invention provides an improved chemiluminescent fishing float, which will be described subsequently in great detail, is to provide a new and improved chemiluminescent fishing float which is not anticipated, rendered obvious, suggested, or even implied by the prior art, either alone or in any combination thereof.

To attain this, the present invention essentially comprises a chemiluminescent light stick that is slidably lockable into a central passageway of a bobber. The bobber also has a means for attaching onto a fishing line. Both ends of the locked in place chemiluminescent light stick protrude from the central cavity of the bobber, whereby providing the above water and the below water light source.

There has thus been outlined, rather broadly, the more important features of the invention in order that the detailed description thereof that follows may be better understood, and in order that the present contribution of the art may be better appreciated.

The invention may also include a polymeric collar attached around the central passageway so as to allow the chemiluminescent light stick to be slidably forced through the passageway and subsequently locked in place by frictionally adhering to the outer surface of the chemiluminescent light stick. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved chemiluminescent fishing float that has all the advantages of the prior art chemiluminescent fishing float and none of the disadvantages.

It is another object of the present invention to provide a new and improved chemiluminescent fishing float that may be easily and efficiently manufactured and marketed.

An even further object of the present invention is to provide a new and improved chemiluminescent fishing float that has a low cost of manufacture with regard to both materials and labor, and which accordingly is then susceptible of low prices of sale to the consuming public, thereby making such multipurpose storage unit and system economically available to the buying public.

Another object of the present invention is to provide a new and improved luminescent fishing float that is chemiluminescent. This makes it possible to provide a light source which is free of electronic control devices as well as simple to use.

Still another object of the present invention is to provide a new chemiluminescent fishing float that provides in the apparatuses and methods of the prior art some of the advantages thererof, while simultaneously overcoming some of the disadvantages normally associated therewith.

Even still another object of the present invention is to provide a chemiluminescent fishing float having both ends of the locked in place chemiluminescent stick protruding from the central passageway of the bobber. This makes it possible to simultaneously provide an above water light source as well as an underwater light source. The above water light source is for allowing a fisherman to see where the chemiluminescent fishing float is floating. The under water light source is for attracting fish to the underwater vicinity where the chemiluminescent fishing float is floating.

Lastly, it is an object of the present invention to provide a new and improved method of using the chemiluminescent fishing float device is described. The method comprises obtaining the new and improved chemiluminescent fishing float, activating the chemiluminescent light stick, wrapping a fishing line around the chemiluminescent light stick, forcing the chemiluminescent light stick wrapped with fishing line into the central passageway of the bobber, putting a hook on the end of the fish line, baiting the hook, casting the combined bobber/chemiluminescent light stick/hook conglomerate into water and attracting fish with the light.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
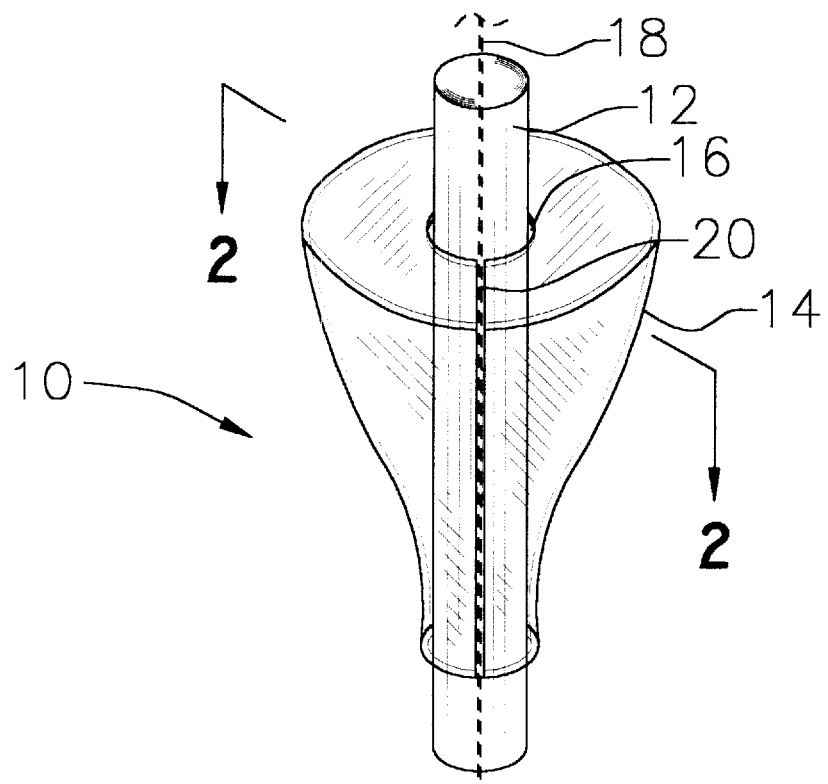
FIG. 1 is a perspective view of one of the preferred embodiment of the chemiluminescent fishing float constructed in accordance with the principles of the present invention.
Figure 2:
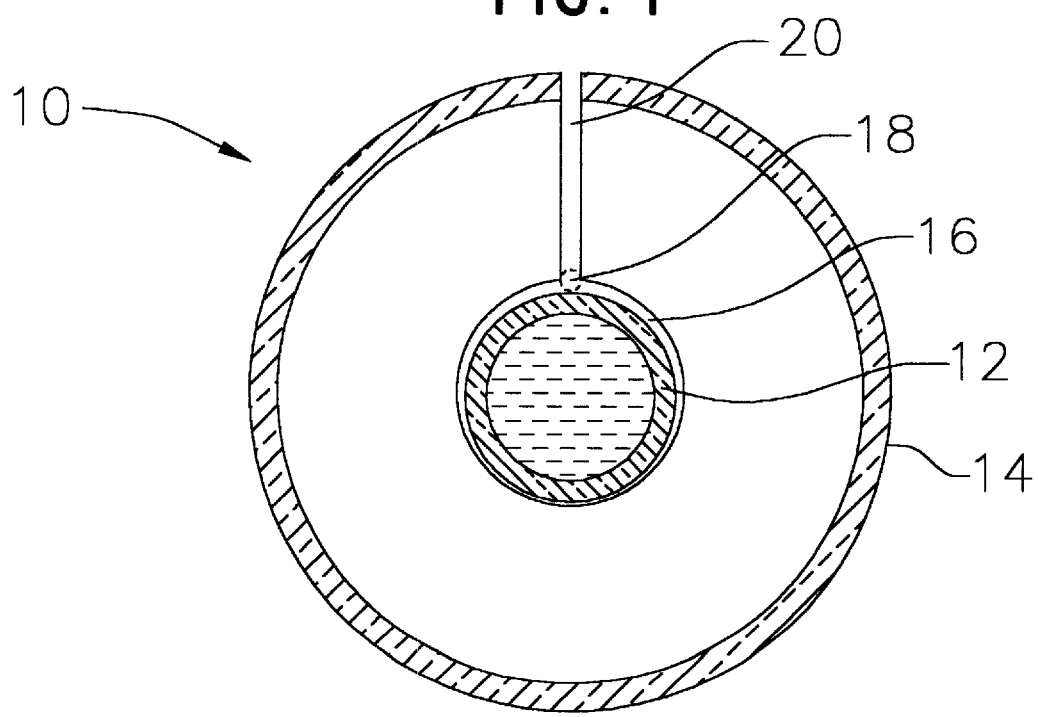
FIG. 2 is a cross sectional view of the chemiluminescent fishing float of the present invention.
Figure 3:
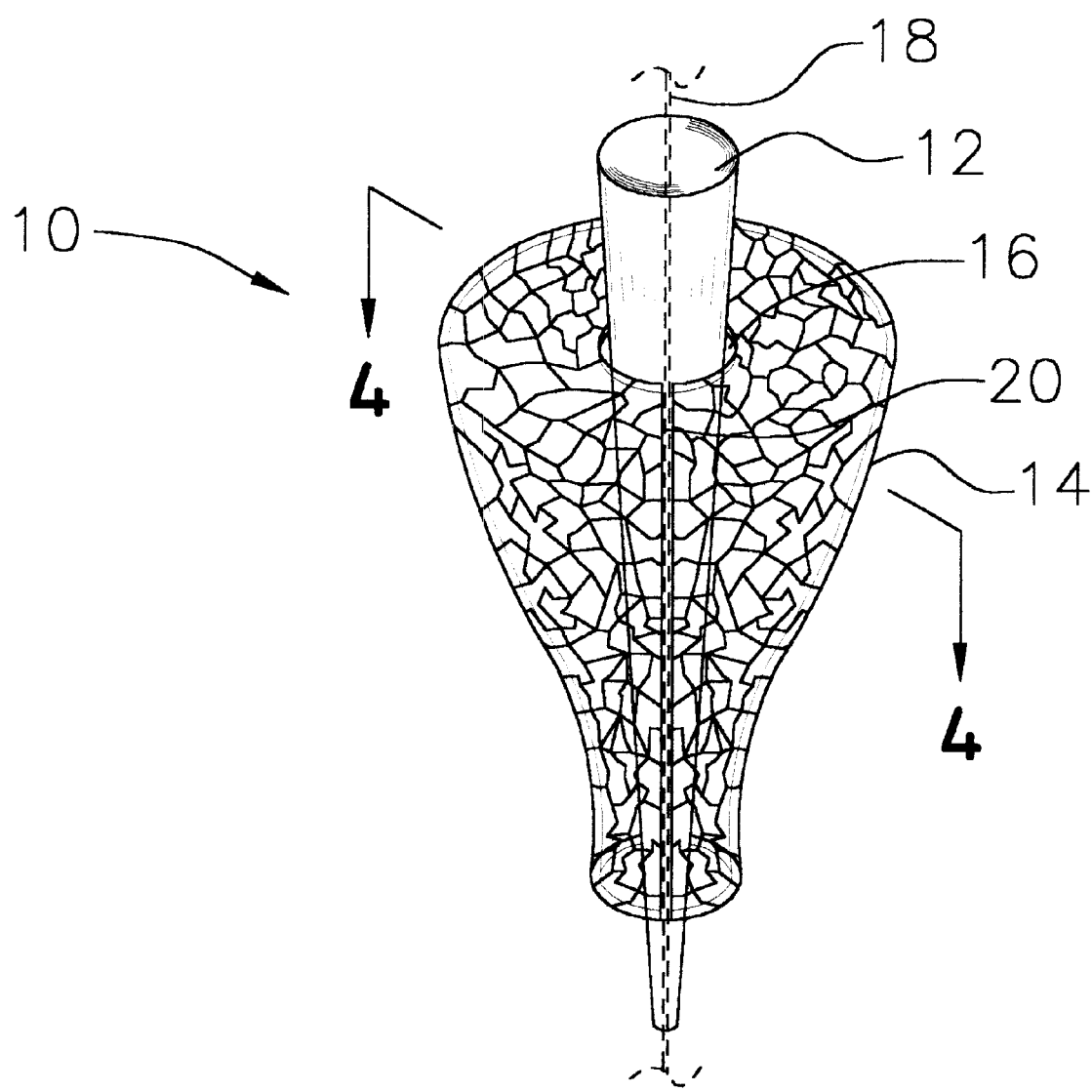
FIG. 3 is a perspective view of another preferred embodiment of the chemiluminescent fishing float of the present invention.

Referring now to the drawings, and in particular FIG. 1 to 3 thereof, one preferred embodiment of the present invention is shown and generally designated by the reference numeral 10. One embodiment of the present invention of the chemiluminescent fishing float 10 for providing an above water light source for use in visually locating where the chemiluminescent fishing float 10 is floating and for providing an underwater light signal for use in attracting fish towards the underwater vicinity where the chemiluminescent fishing float 10 is floating, the chemiluminescent fishing float 10 comprises: a chemiluminescent light stick 12; and a bobber 14. The chemiluminescent light stick 12 is for providing the chemiluminescent emitted light. The bobber 14 having: a central passageway 16; a means for locking and a means for accepting. The central passageway 16 of the bobber 14 is positioned substantially along the central longitudinal axis of the bobber 14. The central passageway 16 of the bobber 14 is capable of slidably accepting the chemiluminescent light stick 12. The means for locking of the bobber 14 is for locking the chemiluminescent light stick 12 in a locked position within the central passageway 16 of the bobber 14 so that the two ends of the chemiluminescent light stick 12 extend beyond the bobber 14. The means for accepting of the bobber 14 is for accepting a fishing line 18 onto the bobber 14.

Another preferred embodiment of the chemiluminescent fishing float 10 comprises a chemiluminescent light stick 12 and a bobber 14. The chemiluminescent light stick 12 comprising an outside chamber and a breakable inside chamber within the outside chamber. The outside chamber containing a first chemical cocktail mixture and the internal chamber containing a second chemical cocktail mixture, in which the internal chamber is breakable by a user so that the first chemical cocktail mixture may be allowed to migrate into the confines of the outside chamber to react with the second chemical cocktail mixture to chemically drive a chemiluminescent light emission. The bobber 14 having: a central passageway 16 and a means for locking the chemiluminescent light stick 12 in locked position within the central passageway 16 of the bobber 14. The central passageway 16 is positioned substantially along the central longitudinal axis of the bobber 14, in which the central passageway 16 capable of slidably accepting the chemiluminescent light stick 12. The means for locking the chemiluminescent light stick 12 in locked position within the central passageway 16 of the bobber 14 so that the two ends of the chemiluminescent light stick 12 extend beyond the bobber 14 comprises that the locking means is the internal diameter of the central passageway 16 in which it is slightly larger than the external diameter of the chemiluminescent light stick 12. When a fishing line 18 is wrapped around the chemiluminescent light stick 12 and then slidably inserted within the central passageway 16, then the chemiluminescent light stick 12 is frictionally locked within the central passageway 16 of the bobber 14.

The chemiluminescent light stick 12 may comprise any commercially available chemiluminescent light stick. One preferred configuration of the chemiluminescent light stick 12 comprises an outside chamber and a breakable inside chamber within the outside chamber, in which the outside chamber containing a first chemical cocktail mixture and the internal chamber containing a second chemical cocktail mixture. In this preferred configuration the internal chamber is breakable by a user so that the first chemical cocktail mixture may be allowed to migrate into the confines of the outside chamber to react with the second chemical cocktail mixture to chemically drive a chemiluminescent light emission. One preferred configuration of the first chemical cocktail mixture comprises a reductant compound and a fluorescent dye compound and the second chemical cocktail mixture comprises an oxidant compound and a solvent. Another preferred configuration of the first chemical cocktail mixture comprises an oxidant compound and a solvent; and the second chemical cocktail mixture comprises a reductant compound and a fluorescent dye compound. The oxidant may be hydrogen peroxide. The reductant may be oxalic phthalate and the solvent may be water. The fluorescent dye compound may be selected from the group consisting of 9,10-diphenylanthracene, 9,10-bis(phenylethynyl) anthracene, and 5,6,11,12-tetraphenylnaphthacene.

The means for accepting the fishing line 18 of the bobber 14 may be any commercially available device or known method which is capable of securing a fishing line onto a bobber 14. One preferred configuration of the means for accepting the fishing line 18 is a slot 20 positioned along the longitudinal axis of the bobber 14 and extending from the exterior of the bobber 14 into the central passageway 16. Another preferred configuration of the means for accepting a fishing line 18 is loop attached to the bobber 14. Yet another preferred configuration of the means for accepting a fishing line 18 is an extendable hook attached to the bobber 14. Yet another preferred configuration of the means of accepting a fishing line 18 is to directly tie the line onto the chemiluminescent light stick 12 that is locked onto the bobber 14.

The locking means of the bobber 14 may be any commercially available device capable of locking two elements together. One preferred configuration of the locking means of the bobber 14 is that the internal diameter of the central passageway 16 is slightly larger than the external diameter of the chemiluminescent light stick 12 so that a fishing line 18 may be wrapped around the chemiluminescent light stick 12 to frictionally lock the chemiluminescent light stick 12 within the central passageway 16. Another preferred locking means of the bobber 14 comprises: an external screw thread at one end of the bobber 14; a trigonal shaped ferrule having an hole with an internal diameter which is capable of slidably accepting the chemiluminescent light stick 12, the top of the ferrule having an outer diameter greater than the diameter of the central passageway 16, the bottom of the ferrule having an outer diameter less than the diameter of the central passageway 16; and a compression cap having an orifice with an internal diameter greater than the chemiluminescent light stick 12 and less than the diameter of the top of the ferrule, the compression cap having an internal screw thread capable of accepting the external screw thread of the bobber 14, wherein the compression cap for compressing the ferrule against the bobber 14 and against the side of the chemiluminescent light stick 12 whereby locking the chemiluminescent light stick 12 to the bobber 14. Yet another locking means of the bobber 14 comprises a first and second pliable O-ring, wherein the first and second O-ring are capable of slidably rolling over the ends of the chemiluminescent light stick 12 when the chemiluminescent light stick 12 is positioned along the central passageway 16 of the bobber 14, whereby locking the chemiluminescent light stick 12 to the bobber 14. In this preferred configuration may be augmented with the top and bottom ends of the bobber 14 each having a male threaded portion; and a top and a bottom cap. The top and bottom caps each have a centrally placed aperture. Each aperture has a diameter greater than the diameter of the chemiluminescent light stick 12. Also the first and second cap each having a female threaded portion capable of accepting the corresponding male threaded portions of the respective top and bottom ends of the bobber 14, in which when the chemiluminescent light stick 12 is positioned along the central passageway 16 and when the O-rings are slidably rolled over the ends of the chemiluminescent light stick 12 then the top and bottom caps are capable of locking the chemiluminescent light stick 12 by tightened over the corresponding male threaded portions of the respective top and bottom ends of the bobber 14. Even yet another preferred configuration of the locking means of the bobber 14 comprises a slot 20 positioned along the longitudinal axis of the bobber 14 and extending from the exterior of the bobber 14 into the central passageway 16; the inner diameter of the central passageway 16 having a diameter slightly smaller than the outer diameter of the chemiluminescent light stick 12; and the bobber 14 being composed of a resilient polymeric material, wherein when the chemiluminescent light stick 12 is slidably forced through the central passage way, the diameter of the central passage way expands to accommodate the chemiluminescent light stick 12 and the diameter of the central passage way contracts around the chemiluminescent light stick 12, whereby locking the chemiluminescent light stick 12 to the bobber 14. Still another preferred configuration of the locking means of the bobber 14 comprises a polymeric collar attached around the central passageway 16. This polymeric collar having an inner diameter slightly smaller than the diameter of the chemiluminescent light stick 12, so that when the chemiluminescent light stick 12 is slidably forced through the polymeric collar, the diameter of the polymeric collar expands to accommodate the chemiluminescent light stick 12 and the inner surface of the polymeric collar subsequently frictionally adheres to the outer surface of the chemiluminescent light stick 12. The polymeric collar may be made of any commercially available resilient material. One preferred configuration of the polymeric material is that it is made of material selected from the group consisting of natural rubber, styrene butadiene rubber, butadiene acrylonitrile rubber, butyl rubber, nitrite rubber, ethylene propylene terpolymer, polysulfide rubber, and neoprene. Finally, still yet another preferred configuration of the locking means of the bobber 14 the chemiluminescent light stick 12 having a conical shape and the central passageway 16 having a truncated conical shape, wherein when the conically shaped chemiluminescent light stick 12 is slidably inserted through the truncated conical shaped central passageway 16, the conically shaped chemiluminescent light stick 12 is frictionally locked around the truncated conical shaped centra passageway of the bobber 14.

A method of using a chemiluminescent fishing float for providing an above water chemiluminescent light source for use in visually locating where the chemiluminescent fishing float 10 is floating and for providing an underwater chemiluminescent light source for use in attracting fish towards the underwater vicinity where the chemiluminescent fishing float 10 is floating. The method comprising: obtaining, activating, getting, wrapping, forcing, putting, baiting, casting, and attracting steps. The obtaining step comprises obtaining a chemiluminescent light stick 12. The activating step comprises activating the chemiluminescent light stick 12 to emit light. The getting step comprises getting a bobber 14 having: a central passageway 16 positioned substantially along the central longitudinal axis of the bobber 14, the central passageway 16 capable of slidably accepting the chemiluminescent light stick 12; a means for locking the chemiluminescent light stick 12 in locked position within the central passageway 16 of the bobber 14 so that the two ends of the chemiluminescent light stick 12 extend beyond the bobber 14; and a means for accepting a fishing line 18. The wrapping step comprises wrapping a fishing line 18 around the chemiluminescent light stick 12. The forcing step comprises forcing the chemiluminescent light stick 12 with the fishing line 18 wrapped around it into the central passageway 16 of the bobber 14 to a locked position with the two ends of the chemiluminescent light stick 12 protruding from the bobber 14. The putting step comprises putting a hook on the end of the fish line. The baiting step comprises baiting the hook. The casting step comprises casting the combination of the bobber 14, the chemiluminescent light stick 12, and the baited hook conglomerate out into a body of water. The seeing step comprises seeing the above water chemiluminescent light source emitted from the chemiluminescent light stick 12 locked to the bobber 14 floating in the water. Finally, the attracting step comprises attracting fish with the underwater chemiluminescent light emitted from the chemiluminescent light stick 12 locked to the bobber 14.

Referring now to FIG. 1, a perspective view of one of the preferred embodiment of the chemiluminescent fishing float is graphically depicted. The chemiluminescent light stick 12 is slidably inserted within the central passageway 16 of the bobber 14 so that both ends of the chemiluminescent light stick 12 protrude from the bobber 14. As discussed above, the chemiluminescent light stick 12 may be locked in place by any number of different configuration device or methods, such as winding the fishing line around the chemiluminescent light stick 12 and jamming this conglomerate into the central passageway 16 of the bobber 14. The means for accepting the fishing line 18 of the bobber 14 may be any commercially available device or known method which is capable of securing a fishing line onto a bobber 14. One preferred configuration of the means for accepting the fishing line 18 is a slot 20 positioned along the longitudinal axis of the bobber 14 and extending from the exterior of the bobber 14 into the central passageway 16. The slot 20 positioned along the longitudinal axis of the bobber 14 may also serve as an element of the locking means of locking the chemiluminescent light stick 12 within the central passageway 16 of the bobber. That is, one preferred configuration of the locking means of the bobber 14 comprises a slot 20 positioned along the longitudinal axis of the bobber 14 and extending from the exterior of the bobber 14 into the central passageway 16; the inner diameter of the central passageway 16 having a diameter slightly smaller than the outer diameter of the chemiluminescent light stick 12; and the bobber 14 being composed of a resilient material so that the width of the slot 20 widens as the chemiluminescent light stick 12 is slidably forced through the central passage way. When the width of the slot 20 narrows, the central passageway 16 of the bobber 13 squeezes around the chemiluminescent light stick 12, and thus locking the chemiluminescent light stick 12.

Referring now to FIG. 2 which graphically depicts a cross sectional view of one of the embodiments of the chemiluminescent fishing float 10 of the present invention. The chemiluminescent light stick 12 is slidably inserted and eventually locked within the central passageway 16 of the bobber 14 so that both ends of the chemiluminescent light stick 12 protrude from the bobber 14. A slot 20 positioned along the longitudinal axis of the bobber 14 and extending from the exterior of the bobber 14 into the central passageway 16 may serve a dual function of providing a means for accepting a fishing line 18, as well as, serving as an element in the means for locking the chemiluminescent light stick 12 within the central passageway 16 of the bobber 14, as discussed above. The bobber 12 may be made of any material, however, one preferred configuration of the bobber is that it is transparent to the emitted chemiluminescent light so that not only does the chemiluminescent light stick 12 provide light above and below the bobber, the chemiluminescent light stick 12 provides light escaping through the transparent bobber 12.

Refer now to FIG. 3, which illustrates a conically shaped configuration of the chemiluminescent light stick 12 and the truncated conically shaped centra passageway 16 of the bobber 14. This conical shape may serve as an element of the locking means when the user slidably forces the chemiluminescent light stick 12 within the central passageway 16 so that the contacting surfaces frictionally adhere to each other, and thus locking the chemiluminescent light stick 12 in the bobber 14. It should be noted that the bobber 12 could be made of any type of material so long as it floats. However, one preferred configuration of the bobber is that it is transparent so that it is able to transmit the emitted chemiluminescent light from the chemiluminescent light stick 12. Thereby, in this configuration the float not only provides light above and below the bobber, but also provides light escaping through the transparent bobber 12.

As to the manner of usage and operation of the present invention, the same should be apparent from the above description. Accordingly, no further discussion relating to the manner of usage and operation will be provided.

While a preferred embodiment of the chemiluminescent fishing float has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any sturdy material such as metal, plastic or a variety of wood may be used. The bobber may also be made of transparent material so that the light from the internal central passageway may also escape from the confines of the bobber.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of using a chemiluminescent fishing float for providing an above water chemiluminescent light source for use in visually locating where the chemiluminescent fishing float is floating and for providing an underwater chemiluminescent light source for use in attracting fish towards the underwater vicinity where the chemiluminescent fishing float is floating, said method comprising:

obtaining a chemiluminescent light stick;

activating the chemiluminescent light stick to emit light;

getting a bobber having: a central passageway positioned substantially along the central longitudinal axis of the bobber, the central passageway capable of slidably accepting the chemiluminescent light stick; a means for locking the chemiluminescent light stick in locked position within the central passageway of the bobber so that the two ends of the chemiluminescent light stick extend beyond the bobber; and a means for accepting a fishing line;

wrapping a fishing line around said chemiluminescent light stick;

forcing said chemiluminescent light stick with the fishing line wrapped around it into the central passageway of the bobber to a locked position with the two ends of the chemiluminescent light stick protruding from the bobber;

putting a hook on the end of the fish line;

baiting the hook;

casting the combination of the bobber, the chemiluminescent light stick, and the baited hook conglomerate out into a body of water;

seeing the above water chemiluminescent light source emitted from the chemiluminescent light stick locked to the bobber floating in the water; and attracting fish with the underwater chemiluminescent light emitted from the chemiluminescent light stick locked to the bobber.

* * * * *